June 10, 1930.　　　　G. E. LEMON　　　　1,763,470
STEERING GEAR
Filed Sept. 20, 1927
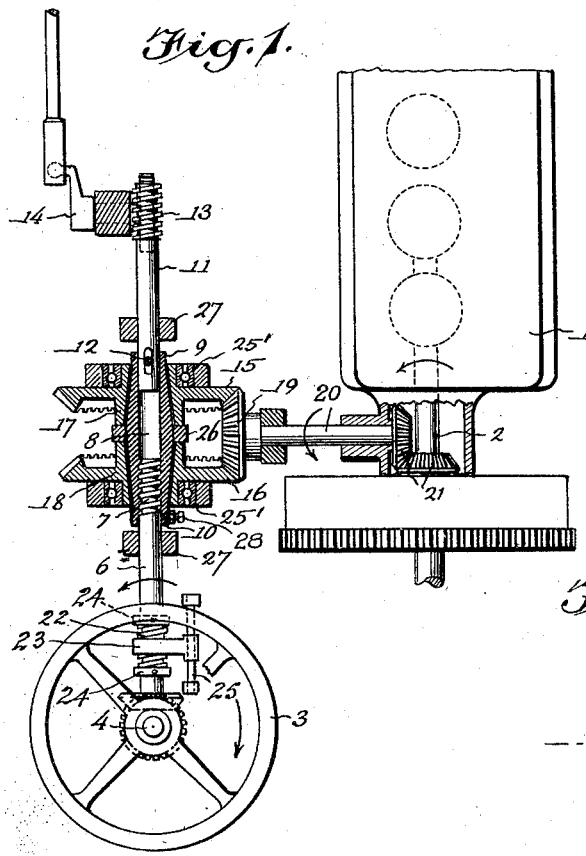
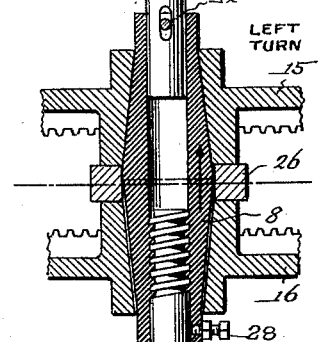
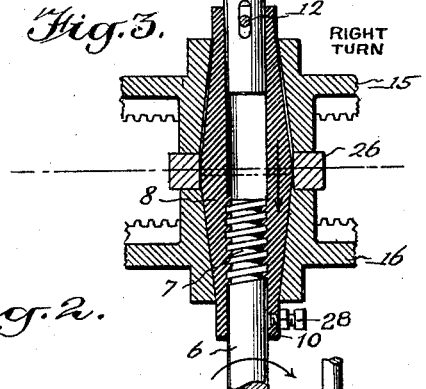
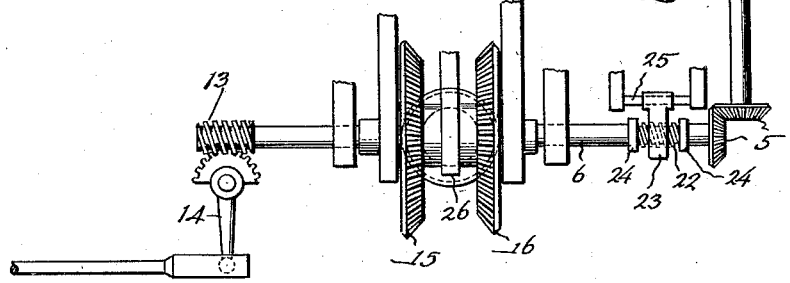
WITNESSES
INVENTOR
G. E. LEMON
BY
ATTORNEY Patented June 10, 1930

1,763,470

UNITED STATES PATENT OFFICE

GEORGE EDWARD LEMON, OF BROOKLYN, NEW YORK

STEERING GEAR

Application filed September 20, 1927. Serial No. 220,745.

This invention relates to steering gear and more particularly to an automatic or power operated, manually controlled steering gear.

The broad object of the invention is to provide a steering gear in which the engine or other motor is utilized to shift the angular disposition of the steering wheels, it being only necessary for the operator to initiate the movement.
In the steering of trucks, tractors and other heavy vehicles it requires a great deal of strength and power to turn the steering wheel, and while my invention is of course adapted for use in connection with any vehicle it is particularly adapted for use in connection with vehicles requiring considerable strength and power to steer, and by the employment of my improved device the movement of the steering gear is done by the engine under the control of the operator. This not only results in relieving the operator of the laborious task heretofore required but accomplishes the steering operation quickly, smoothly and efficiently.
With these and other objects in view, the invention consists in certain novel features of construction and combinations and arrangements of parts, which will be more fully hereinafter described and pointed out in the claims.

In the accompanying drawings—

Figure 1 is a sectional plan view, more or less diagrammatic, illustrating my improved steering gear;
Figure 2 is a view in elevation looking at the left of Figure 1;

Figure 3 is a fragmentary view in longitudinal section showing the position of the parts for a right turn;
Figure 4 is a similar view showing the position of the parts for a left turn.

1 represents the engine or motor of a vehicle and 2 a drive shaft operated thereby. My improved steering gear includes the provision of an ordinary steering wheel 3 or any other steering device operatively connected to a steering post 4, which may be at any desired angle and which is connected by miter gears 5 to the shaft 6 extending forwardly.
The forward end of the shaft 6 is screw- threaded, as shown at 7, and engages internal screw threads in a clutch sleeve 8. This clutch sleeve is tubular in form and has oppositely tapered ends 9 and 10. In other words, the sleeve has a longitudinal bore, screw-threaded at one end to receive the threaded end 7 and externally is of general truncated conical form at its ends, the sleeve being of greatest diameter at its intermediate portion and reducing in diameter toward both ends.

A shaft 11 alined with the shaft 6 has a slot and pin connection 12 in the end of clutch sleeve 8, and at its forward end has a screw or worm 13 to operatively control the movement of a conventional type of knuckle 14.

15 and 16 indicate bevel gear wheels facing each other and having hubs 17 and 18, respectively, thereon which are conically bored, receiving the conical or tapering ends of the clutch sleeve 8. These gear wheels 15 and 16 are in constant mesh with a driving pinion 19 on a shaft 20 connected by miter gears 21 with the drive shaft 2 of the engine 1.

On the shaft 6 a screw-threaded portion 22 is provided, receiving a nut 23 thereon and having shoulders or stops 24 limiting the movement of the nut. This nut 23 is keyed to a frame 25 so as to prevent turning movement of the nut.

I of course do not limit myself to the specific manner in which the several parts are mounted or supported but it is to be understood of course that the gear wheels 15 and 16 have rotary mounting in a support which prevents them from moving toward or away from each other, and to indicate such a support I have shown roller bearings 25' around the hubs of the gear wheels.

I also show a spacing ring 26 between the hubs of the gear wheels, and this spacing ring 26 acts as a support for the clutch sleeve 8. Bars, such as indicated at 27, function as supports for the shafts 6 and 11, respectively, and any other suitable means may be provided which will function properly to hold the parts in their relative position, no attempt being made to illustrate a specific structure for this purpose.

The operation is as follows:

Figure 1 shows the clutch sleeve 8 in neutral position and it is to be understood that the gear wheels 15 and 16 are continuously turned through the medium of the pinion 19 of the engine or motor, as above described. In steering, the operator turns the steering wheel 3 either to the right or left, as he does in ordinary steering. When he turns the steering wheel to the right the shaft 6 is caused to turn through the medium of gears 5. The screw-threaded end 7 of said shaft 6 turning in the sleeve 8 will draw the sleeve toward the steering wheel to friction-bind the clutch sleeve in the hub of gear wheel 16, as shown in Figure 3. This will cause the gear wheel 16 to turn the sleeve 8 and shaft 11 in the direction to move the steering wheel to steer to the right. When the operator ceases to turn the steering wheel 3 and holds the same against turning movement, the gear wheel 16 will free itself from the clutch sleeve as the drag on the clutch sleeve is relieved as soon as turning movement of the steering wheel ceases.

It is perfectly obvious that when the steering wheel is turned in the opposite direction the clutch sleeve 8 will be moved to the position shown in Figure 4 so that the gear wheel 16 will operatively turn the clutch sleeve and the shaft 11 to steer in the opposite direction.

To prevent any possibility of the power transmitting mechanism turning the steering wheel too far in either direction, the nut 23 is employed on the threaded portion 22 of shaft 6, so that when this nut reaches either one of the stops or shoulders 24 it will prevent any further turning movement of said shaft, and the pressure of the clutch sleeve in the bearing of the gear wheel will be relieved and the gear wheel will free itself from the clutch sleeve.

It is desirable to provide some means whereby the steering gear may be manually manipulated and I have illustrated for the purpose a set screw 28 in the clutch sleeve 7 which permits the sleeve to be fixedly secured to shaft 6 and compel said parts to turn together.

It is obvious that other means may be employed for preventing over movement and the bars may be variously located relative to each other and to the parts of the vehicle, and various changes may be made in the general form and arrangement of the parts without departing from my invention. Hence I do not limit myself to the precise details set forth but consider myself at liberty to make such changes and alterations as fairly fall within the spirit and scope of the appended claims.

I claim:

1. A steering gear, including a pair of alined shafts, a clutch sleeve having oppositely tapered ends, said sleeve having screw-threaded engagement with one shaft and secured to turn with the other shaft, a pair of gear wheels having internally tapered hubs mounted for rotation on the opposite ends of said clutch sleeve, a pinion meshing with both of said gears, motor driven means operatively connected to the pinion, and manually operated means connected to the shaft having screw-threaded engagement with the clutch sleeve.

2. A steering gear, including a pair of alined shafts, a clutch sleeve having oppositely tapered ends, said sleeve having screw-threaded engagement with one shaft and secured to turn with the other shaft, a pair of gear wheels having internally tapered hubs mounted for rotation on opposite ends of said clutch sleeve, a pinion meshing with both of said gears, motor driven means operatively connected to the pinion, a steering post operatively connected to the shaft having screw-threaded engagement with the clutch sleeve, and a steering wheel on said post.

3. A steering gear, including a pair of alined shafts, a clutch sleeve having oppositely tapered ends, said sleeve having screw-threaded engagement with one shaft and secured to turn with the other shaft, a pair of gear wheels having internally tapered hubs mounted for rotation on the opposite ends of said clutch sleeve, a pinion meshing with both of said gears, motor driven means operatively connected to the pinion, manually operated means connected to the shaft having screw-threaded engagement with the clutch sleeve, one of said shafts having a screw thereon, stops at the ends of the screw, and a nut movable on the screw and adapted when engaging either of said stops to prevent further movement of the manually operated means and permit the gear wheels to free themselves from the clutch sleeve.

4. A steering gear, including a pair of alined shafts, a clutch sleeve having oppositely tapered ends, said sleeve having screw-threaded engagement with one shaft and secured to turn with the other shaft, a pair of gear wheels having internally tapered hubs mounted for rotation on opposite ends of said clutch sleeve, a pinion meshing with both of said gears, motor driven means operatively connected to the pinion, a steering post operatively connected to the shaft having screw-threaded engagement with the clutch sleeve, a steering wheel on said post, one of said shafts having a screw thereon, stops at the ends of the screw, and a nut movable on the screw and adapted when engaging either of said stops to prevent further movement of the manually operated means and permit the gear wheels to free themselves from the clutch sleeve.

Signed at New York in the county of New York and State of New York this 19th day of September A. D. 1927.

GEORGE EDWARD LEMON.